(12) United States Patent
Hertzog

(10) Patent No.: US 11,375,652 B2
(45) Date of Patent: Jul. 5, 2022

(54) MOUNTING ASSEMBLY FOR PLOUGH SKIMMERS

(71) Applicant: CNH Industrial America LLC, New Holland, PA (US)

(72) Inventor: Daniel Hertzog, Blackstad (SE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/865,343

(22) Filed: May 2, 2020

(65) Prior Publication Data
US 2020/0352076 A1 Nov. 12, 2020

(30) Foreign Application Priority Data
May 7, 2019 (EP) ...................................... 19173026

(51) Int. Cl.
*A01B 15/14* (2006.01)
*A01B 3/26* (2006.01)

(52) U.S. Cl.
CPC ................ *A01B 15/14* (2013.01); *A01B 3/26* (2013.01)

(58) Field of Classification Search
CPC ......... A01B 15/02; A01B 15/10; A01B 15/14; A01B 3/26
See application file for complete search history.

(56) References Cited

U.S. PATENT DOCUMENTS

| | | | |
|---|---|---|---|
| 829,592 A | 8/1906 | Lundy | |
| 1,230,964 A * | 6/1917 | Wheat | A01B 15/10 172/415 |
| 2,304,383 A * | 12/1942 | Strandlund | A01B 3/18 172/161 |
| 2,317,560 A * | 4/1943 | Stroup | A01B 15/10 172/664 |
| 2,915,131 A * | 12/1959 | Yetter | A01B 15/10 172/736 |
| 3,219,128 A * | 11/1965 | Van Der Lely | A01B 3/421 172/711 |
| 3,522,851 A * | 8/1970 | Reddick, Jr. | A01B 15/10 172/736 |

(Continued)

FOREIGN PATENT DOCUMENTS

| | | |
|---|---|---|
| DE | 1074306 B | 1/1960 |
| DE | 7415663 U | 9/1974 |

(Continued)

OTHER PUBLICATIONS

Extended European Search Report for EP 19173026.6 dated Nov. 17, 2019 (six pages).

*Primary Examiner* — Jessica H Lutz
(74) *Attorney, Agent, or Firm* — Rebecca L. Henkel; Rickard K. DeMille

(57) ABSTRACT

A mounting assembly for plough skimmers comprises a mounting rail adapted to be connected to the main frame of a plough and a skimmer support bracket adapted to surround parts of the mounting rail. The mounting rail and the skimmer support bracket are arranged such that the mounting rail and the skimmer support bracket are braced against each other in at least two directions when the plough skimmer is in use, wherein the at least two directions are oblique to a ploughing direction.

15 Claims, 11 Drawing Sheets

(56) References Cited

U.S. PATENT DOCUMENTS

| | | | | |
|---|---|---|---|---|
| 3,980,141 A * | 9/1976 | Vest, Jr. | A01B 3/421 | 172/225 |
| 4,293,043 A * | 10/1981 | Neukom | A01B 61/046 | 172/267 |
| 4,295,532 A * | 10/1981 | Williams | A01C 7/006 | 172/184 |
| 4,323,126 A * | 4/1982 | Stikeleather | A01B 13/14 | 172/147 |
| 4,519,461 A * | 5/1985 | Harden | A01B 61/044 | 172/225 |
| 4,607,707 A * | 8/1986 | Shellhouse | A01B 15/025 | 172/764 |
| 5,127,480 A * | 7/1992 | Desta | A01B 3/42 | 172/218 |
| 5,154,239 A * | 10/1992 | Harrell | A01B 61/044 | 172/219 |
| 5,183,232 A * | 2/1993 | Gale | A47B 96/06 | 248/220.22 |
| 5,191,941 A * | 3/1993 | Nja | A01B 3/42 | 172/224 |
| 5,191,945 A * | 3/1993 | Loya | A01B 17/002 | 172/734 |
| 5,255,748 A * | 10/1993 | Schuckman | A01B 17/00 | 172/203 |
| 2005/0254897 A1 * | 11/2005 | Ewer | E04F 21/248 | 404/112 |
| 2015/0272334 A1 * | 10/2015 | Gloeckl | A47C 7/462 | 297/284.7 |
| 2018/0235136 A1 * | 8/2018 | Hamilton | A01B 13/08 | |
| 2018/0313048 A1 * | 11/2018 | Lynch | F16B 21/02 | |
| 2018/0368305 A1 * | 12/2018 | Sanderson | F16B 2/14 | |

FOREIGN PATENT DOCUMENTS

| | | |
|---|---|---|
| EP | 3000291 A1 | 3/2016 |
| FR | 2466939 A1 | 4/1981 |

* cited by examiner

MOUNTING ASSEMBLY FOR PLOUGH SKIMMERS

BACKGROUND OF THE INVENTION

The present disclosure relates to a mounting assembly for agricultural vehicles, particularly a mounting assembly for ground engaging parts of agricultural implements. In one aspect of the present disclosure, there is provided a mounting assembly for a plough skimmer. Another aspect relates to a method for manufacturing such mounting assemblies.

In agriculture, farming cycles are followed that can roughly be divided into the different steps of land preparation, seed sowing, fertilizing, irrigation, crop growth, and harvesting. Each of these steps is critical to yield optimal crop results and achieve the desired returns on initial investments. Of the listed steps, land preparation is typically further divided into steps of, as necessary, clearing obstructions (e.g. bushes, stones and rocks) and subsequent tillage.

Tilling crumbles and loosens the soil, improves the soil structure and incorporates crop residues and manure into the soil, thus fertilizing the ground. The improved soil structure allows for increased plant root growth, soil aeration and water penetration/filtration. Overall this results in higher yields, better long-term soil fertility, soil moisture retention, and weed management. Tillage can be separated into primary (relatively deep) and secondary (relatively shallow) tillage. In primary tillage, such as ploughing, the soil is turned over such that nutrients come to the surface. In addition to turning up the soil to bring fresh nutrients to the top and depositing plant residue below where it will break down, this process also aerates the earth—enabling it to hold more moisture. Preparing the land to a greater depth produces a rougher surface finish than secondary tillage. Secondary tillage (e.g. seedbed cultivation) breaks up soil clods into smaller masses which might be desirable for small seeds or plants that have minimal clod-handling ability.

Primary tillage, and particularly ploughing, is widely regarded as one of the most effective ways of preventing crop disease, removing weeds, and controlling mice and other pests. In its simplest form the turnplough, also known as the mouldboard plough, includes a variety of plough bodies, which are blades for penetrating and turning over the soil in arrays of adjacent trenches, known as furrows. Modern ploughs typically include a plurality of plough bodies connected to a plough frame such that they are laterally offset manner from each other when the plough is in use. Each plough body is connected to the plough frame via corresponding beams. The plough frame, in turn, is connected to a towing or pushing vehicle via a hitch arranged at a front or back end of the frame.

In addition to the plough bodies, it is known to use so-called "plough skimmers". Typically, one skimmer is placed in front of every plough body. The purpose of the plough skimmers is primarily to cut a shallow layer off the top of the ground surface before the latter is turned over by the plough bodies. The use of plough skimmers results in a more even ploughing result and reduces the amount of plant residues left on the ground surface after ploughing. Accordingly, the use of skimmers further reduces the possibility of inadvertent plant growth in ploughed fields.

Depending on the contours of the work area and the status of the soil, there is a need for the skimmer depth to be adjustable to ensure that the skimmers can be placed in the correct working depth. For example, skimmers are typically arranged up to 10 cm below the ground surface. Arranging the skimmers in a position that is significantly higher or lower than this may reduce the quality of the ploughing result.

The depth adjustment can be achieved in two different ways. In a first skimmer mount type, a mounting bracket holds a shaft (or rail) that is connected to the skimmer. The skimmer shaft runs within the mounting bracket and may be fixed with respect to the bracket by tightening one or more threaded bolts against an outer surface of the shaft. To adjust the depth of the skimmer, the threaded bolts are loosened, and the shaft can be moved up and down with respect to the bracket. Once the depth is adjusted, the bolt is again tightened to fix the skimmer shaft in place. Adjusting the depth with this arrangement usually requires one or more tools to loosen and/or tighten the bolts. A tool-free solution is a skimmer mount type that utilises a pin interlocking the mounting bracket with the shaft to set the depth. To adjust the depth, the pin is removed, thereby allowing movement between the skimmer shaft and the mounting bracket. Once the desired depth is reached, the pin is reinserted in a new position along the shaft. Although this second solution requires no tools for depth adjustment, the connection between the mounting bracket and the skimmer shaft can exhibit significant play, leading to vibrating movements and thus wear between the mounting bracket and the skimmer shaft.

In view of the aforementioned problem, there is a need to provide an improved mounting assembly that is easily adjustable without tools and, at the same time, exhibits reduced vibration and wear.

It is an aim of the present invention to solve or at least ameliorate one or more of problems discussed above.

SUMMARY OF THE INVENTION

Aspects and embodiments of the disclosure provide a mounting assembly and a method for manufacturing a mounting assembly as claimed in the appended claims.

According to an aspect of the present disclosure, there is provided a mounting assembly for a plough skimmer, the mounting assembly comprising a mounting rail configured to be connected to the main frame of a plough and a skimmer support bracket adapted to connect a plough skimmer to the mounting rail. The skimmer support bracket is adapted to surround parts of the mounting rail, the mounting rail and the skimmer support bracket having aligned mating surfaces that are arranged obliquely to a ploughing direction such that the mounting rail and the skimmer support bracket are braced against each other in at least two directions when the plough skimmer is in use.

During use of the plough, reactive forces created by dragging the skimmers through the soil are transferred to the mating surfaces at an oblique angle, thereby separating said force into two components. A first force vector acts to brace the mounting rail and the skimmer support bracket against each other in a direction that is perpendicular to the mating surfaces. A second force vector acts to brace the mounting rail and the skimmer support bracket against each other in a direction that is parallel with the mating surfaces. Arranging the mounting rail and the skimmer support bracket such that they are braced against each other in more than one direction will result in a self-locking connection between the mounting rail and the skimmer support bracket. It should be understood that the arrangement of the mating surfaces will define the directions of self-locking forces acting on the mounting assembly of the present disclosure. The mounting rail and the skimmer support bracket may be shaped or connected to each other in a way that allows the forces transferred from the ground into the mounting rail to be split in two directions that may be oblique to the ploughing direction. This self-locking connection in two directions significantly reduces play and thus wear between the mounting rail and the skimmer support bracket.

The at least two directions may be perpendicular to each other. In other words, the mounting assembly will be locked in place in a two-dimensional plane defined by the at least two directions. Traditional skimmer arrangements, in which the mounting rail and the skimmer support brackets are braced against each other in the ploughing direction only, tend to be susceptible to vibrations in a direction lateral to the ploughing direction. The mounting assembly of the present disclosure avoids such vibrations by converting the force applied to the skimmer into separate force components applied to the skimmer support bracket and the mounting rail in perpendicular directions.

In one embodiment, the mating surfaces are arranged at an angle of 10 degrees to 80 degrees, preferably at an angle of 30 degrees to 60 degrees, with respect to the ploughing direction. Ranging the mating surfaces at an angle of, for example, 45 degrees will distribute the ploughing forces evenly between the two directions mentioned above. This will act to self-lock the mounting assembly in both directions equivalently. However, in order to avoid excessive forces in one of the two directions and/or to increase the force in one of the two directions, the angle of the mating surfaces may be changed. A larger share of the reactive force may be applied in one of the two directions, resulting in lower forces bracing the mounting bracket and the mounting rail together in the respective other direction.

In yet another embodiment, a first mating surface of the mounting rail is a bevelled edge. The mounting rail may have a substantially polygonal cross-section. If none of the side surfaces of the mounting rail are arranged oblique to the to the ploughing direction, then a bevelled edge connecting two side surfaces will be oblique and act to split the ploughing forces into two perpendicular directions to achieve the above self-locking effect.

According to another embodiment, an outer surface contour of the mounting rail matches an inner surface contour of the skimmer support bracket. In other words, each of the sides on the outer surface of the mounting rail has a corresponding side on the inner surface of the mounting bracket. At least one pair of matching sides may be arranged obliquely to the ploughing direction such that the pair of matching sides represent oblique mating surfaces.

In another embodiment, the mounting rail and the skimmer support bracket are arranged such that the mounting bracket may be fixed to the mounting rail at a plurality of locations along the length of the mounting rail. In other words, the depth of the skimmer with respect to the plough frame may easily be adjusted by moving the skimmer support bracket up and down along the length of the mounting rail.

The skimmer support bracket may be connected to the mounting rail by means of a mounting pin, the mounting rail comprising a plurality of mounting holes distributed along the length of the mounting rail and adapted to receive the mounting pin. The mounting pin may extend through both a mounting hole within the skimmer support bracket and one of the plurality of mounting holes along the mounting rail. Whilst the self-locking effect is designed to lock the mounting assembly in a horizontal plane, the mounting pin acts to interlock the mounting rail and the skimmer support bracket in a vertical direction. The self-locking effect together with the interlocking effect of the mounting pin, therefore, avoid movement of the skimmer support bracket with respect to the mounting rail in three translational degrees of freedom, during the ploughing operation. When the ploughing operation is stopped, the self-locking effect ceases, and the skimmer support bracket may be moved with respect to the mounting rail, simply, by removing the mounting pin.

In another embodiment, the skimmer support bracket is a two-piece structure. In this specification, the term "two-piece structure" refers to two parts that are manufactured separately but may be connected to each other permanently or removably at a later stage. In other words, the skimmer support bracket is made up of at least two separate parts that will be connected to each other before use. As will be described in detail below, the two-piece structure of the skimmer support bracket may be used to significantly reduce play between the support bracket and the corresponding mounting rail.

In yet another embodiment, the skimmer support bracket comprises a first part for connection with a first side of the mounting rail and a second part for connection with an opposite, second side of the mounting rail. In other words, the first and second parts of the support bracket may sandwich the mounting rail between each other. The first and second parts may be arranged on opposite sides of the mounting rail and temporarily fixed to the latter using mechanical clamps (or similar means) before being connected to each other. In this way, the play between the skimmer support bracket and the mounting rail can be adjusted accurately. If both parts abut on their respective side with no gaps between them and the mounting rail, then there will be substantially no play and the skimmer support bracket may no longer be adjustable. Consequently, spacers may be used to create small gaps between the two parts and their respective sides of the mounting rail before joining the two parts of the skimmer support bracket. The gaps should be sized to reduce play whilst allowing for a smooth sliding movement of the skimmer support bracket on the mounting rail.

The first and second parts of the mounting rail may be permanently connected to each other. In one embodiment, the first and second parts may be welded together. However, it will be understood that any other means of permanently connecting the first and second parts (e.g. gluing) may also be feasible.

In yet another embodiment, the first part has a generally U-shaped cross section. As such, the first part may not to only cover the first but all sides of the mounting rail except the second side, which, in turn, is covered by the second part of the support bracket. In other words, if the mounting rail has a rectangular cross-section, the U-shaped first part of the skimmer support bracket may cover three sides of the mounting rail, whereas the second part covers one side only, namely the second side of the mounting rail. The U-shaped first part may be formed in such a way that it can be slipped over the sides of the mounting rail.

The second part may be plate shaped, preferably an L-shaped plate. The plate shaped second part may be sized to fit between the limbs of the U-shaped first part. The plate shaped second part and the U-shaped first part may be connected to each other to create a collar closely surrounding the mounting rail.

In another embodiment, the first part of the skimmer support bracket comprises a first mating surface arranged on an inner surface of the skimmer support bracket, the first mating surface being shaped to mate with a first mating surface of the mounting rail, when the skimmer support bracket is connected to the mounting rail.

In another aspect of the present disclosure, there is provided a method for manufacturing a mounting assembly for a plough skimmer, the method comprising the following steps:

providing a mounting rail adapted to be connected to the main frame of a plough;

providing a skimmer support bracket adapted to connect a plough skimmer to the mounting rail, said skimmer support bracket being a two-piece structure comprising a first part and a second part;

arranging the first part of the skimmer support bracket on a first side of the mounting rail;

arranging the second part of the skimmer on an opposite, second side of the mounting rail;

connecting the first part and the second part of the skimmer support bracket with each other.

The first part and the second part may be permanently connected. The first part and the second part may be welded together.

The first and second part may be temporarily connected to the sides of the mounting rail before the first and second parts are connected to each other. In one example, mechanical clamps may be used to temporarily connect the first and second part to the mounting rail. Once the first and second parts are connected to each other.

Spacers may be introduced between the first part and the first side of the mounting rail, before the first part and the second part are connected. Alternatively or additionally, spacers may be introduced between the second part and the second side of the mounting rail, before the first part and the second part are connected.

According to another aspect of the present disclosure, there is provide an agricultural implement comprising a main frame and at least one skimmer connected to the main frame by means of any of the above mounting assemblies. In one embodiment, the agricultural implement may be a plough, for example a reversible plough.

In other embodiments of the disclosure, an agricultural machinery is provided comprising the above agricultural implement connected to the front and/or rear of an agricultural vehicle, e.g. a tractor.

The agricultural vehicle may include one or more control devices, such as but not limited to programmable or non-programmable processors. Similarly, the agricultural implement may include one or more control devices, such as but not limited to programmable or non-programmable processors. Additionally or alternatively, the agricultural implement may be controlled by one or more control devices of the agricultural vehicle. Similarly, the agricultural vehicle may be controlled by one or more control devices of the agricultural implement.

The agricultural vehicle and/or the agricultural implement may be remote controlled, e.g. from a farm office. Accordingly, the agricultural vehicle may include one or more communication interfaces for connection to a remote processor and/or a remote controller. Similarly, the agricultural implement may include one or more communication interfaces for connection to a remote processor and/or a remote controller.

According to an alternative aspect, there is provided a mounting assembly for a plough skimmer, the mounting assembly comprising a support bracket configured to be connected to the main frame of a plough and a skimmer mounting rail adapted to connect a plough skimmer to the support bracket rail. The support bracket is adapted to surround parts of the mounting rail, the mounting rail and the skimmer support bracket having aligned mating surfaces that are arranged obliquely to a ploughing direction such that the mounting rail and the skimmer support bracket are braced against each other in at least two directions when the plough skimmer is in use. The support bracket may be an integral part of the main frame. Further aspects of the support bracket and mounting rail, such as the bevelled edges, may be as described above.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present disclosure will now be described by way of example only, with reference to the accompanying drawings, in which:

FIG. 10 shows a top view of the plough implement of FIG. 1A;

DETAILED DESCRIPTION OF THE DRAWINGS

Figure 1A:
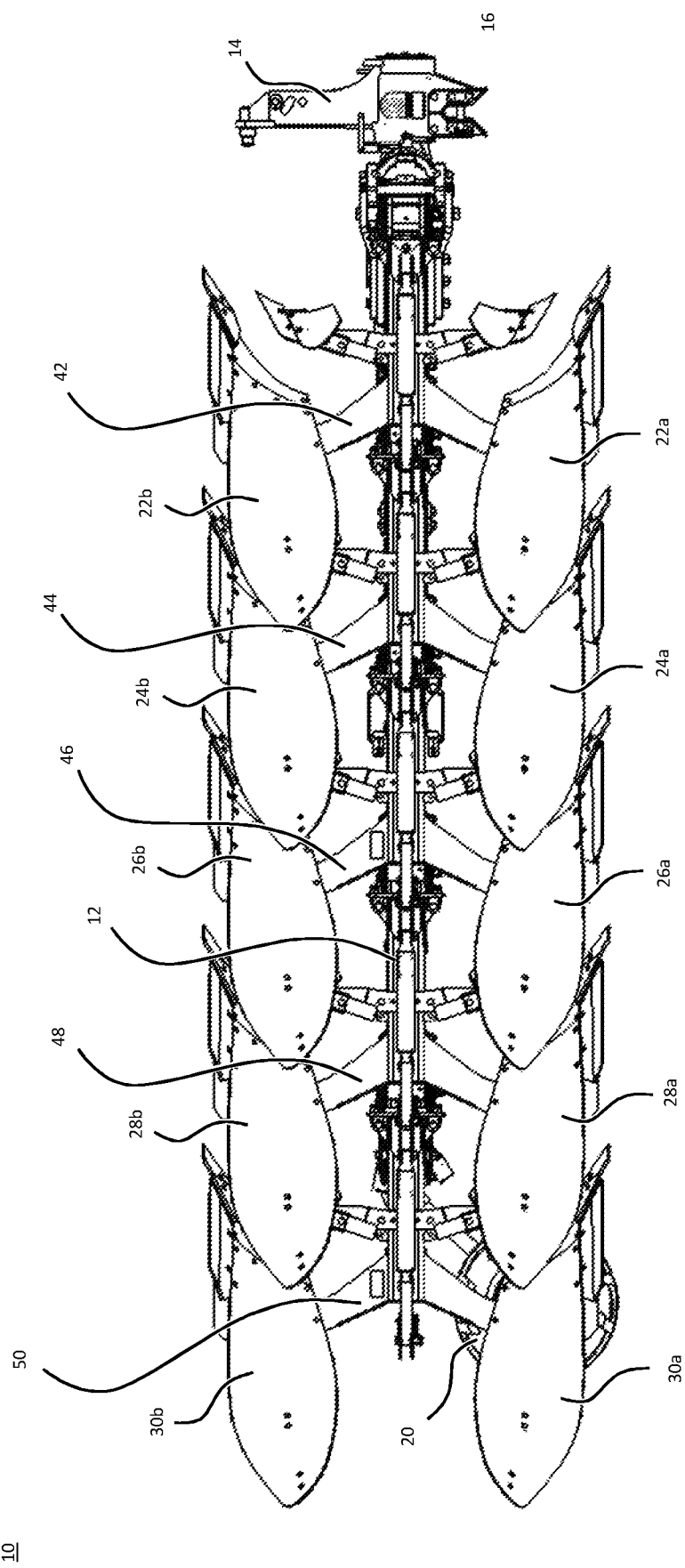
FIG. 1A shows a left-side view of an exemplary plough implement.
Figure 1B:
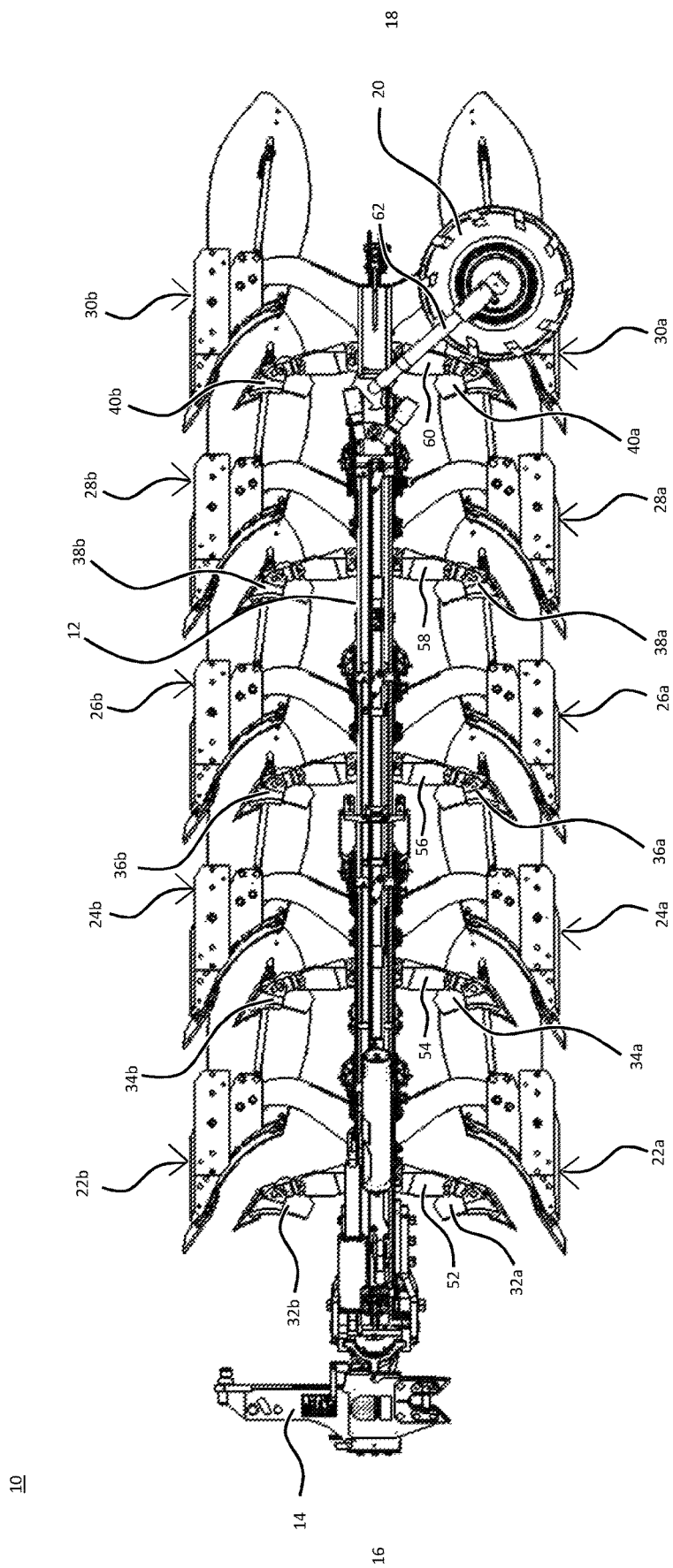
FIG. 1B shows a right-side view of the plough implement of FIG. 1A.
Figure 1C:
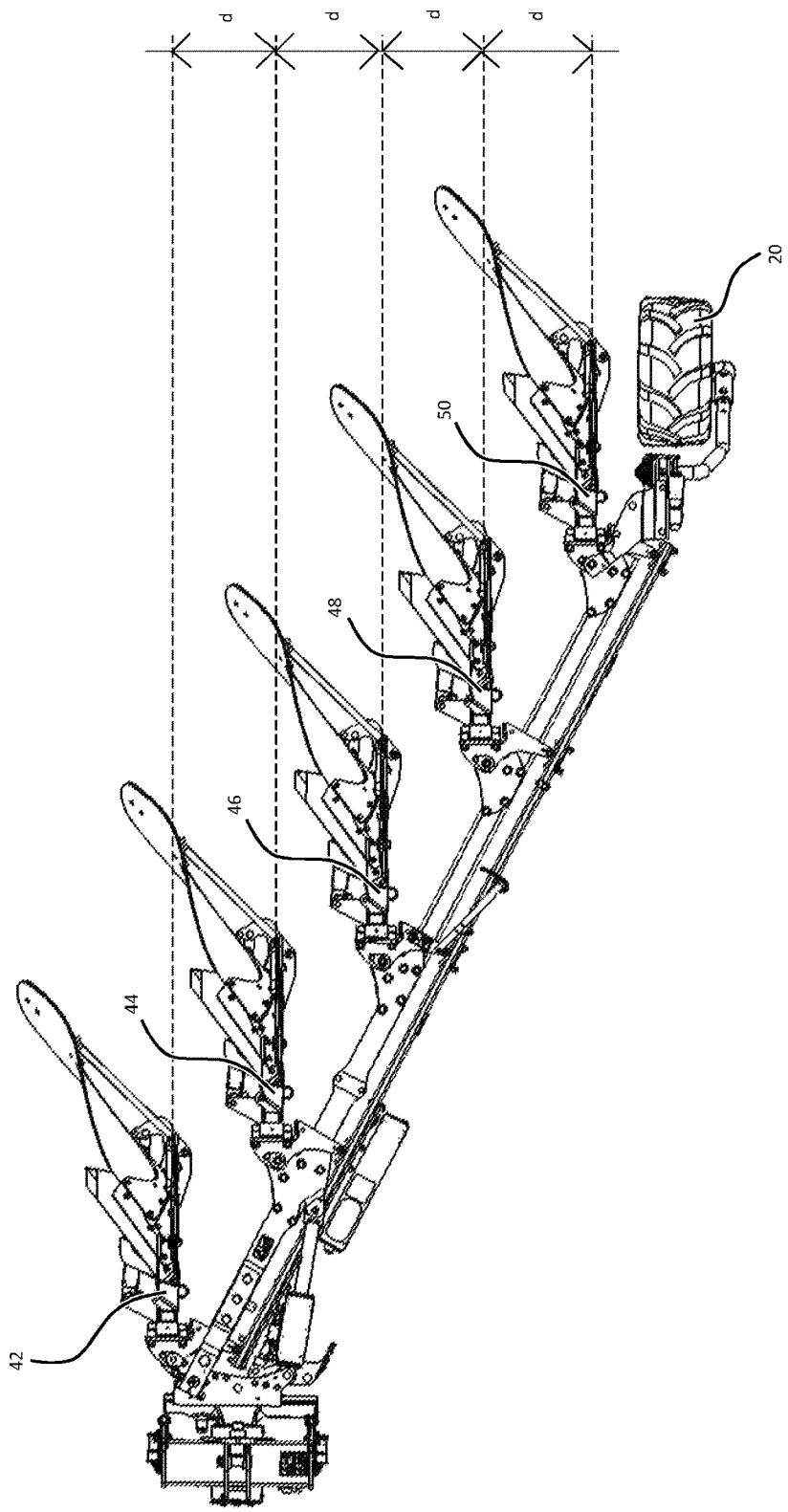

FIGS. 1A to 10 show various views of an agricultural implement, particularly a plough 10. As will be described in more detail below, the plough 10 shown in FIGS. 1A to 10 is a reversible plough.

The plough 10 comprises a main frame 12. The main frame 12 may be a rectangular tube extending between a headstock 14 at a front end 16 of the plough towards a plough wheel 20 at a rear end 18 of the plough. The main frame 12 supports a variety of ground-engaging tools. In the example of FIGS. 1A to 10, the ground engaging tools include plough bodies 22a, 22b, 24a, 24b, 26a, 26b, 28a, 28b, 30a, 30b and plough skimmers 32a, 32b, 34a, 34b, 36a, 36b, 38a, 38b, 40a, 40b. Each of the plough bodies 22a, 22b, 24a, 24b, 26a, 26b, 28a, 28b, 30a, 30b are connected to the main frame 12 by means of beams 42, 44, 46, 48, 50. Each of the beams 42, 44, 46, 48, 50 has a substantially Y-shaped structure, because it connects two plough bodies to the main frame 12, as discussed below.

A first beam 42 supports a first pair of plough bodies 22a, 22b. A second beam 44 supports a second pair of plough bodies 24a, 24b. A third beam 46 supports a third pair of plough bodies 26a, 26b. A fourth beam 48 supports a fourth pair of plough bodies 28a, 28b. A fifth beam 50 supports a fifth pair of plough bodies 30a, 30b. Each of the pairs of plough bodies 22a, 22b, 24a, 24b, 26a, 26b, 28a, 28b, 30a, 30b is designed to create a furrow in the field when the plough is dragged behind or pushed by an agricultural vehicle such as a tractor. It follows that each run of the illustrated plough 10 through a field creates five adjacent furrows.

Figure 8:
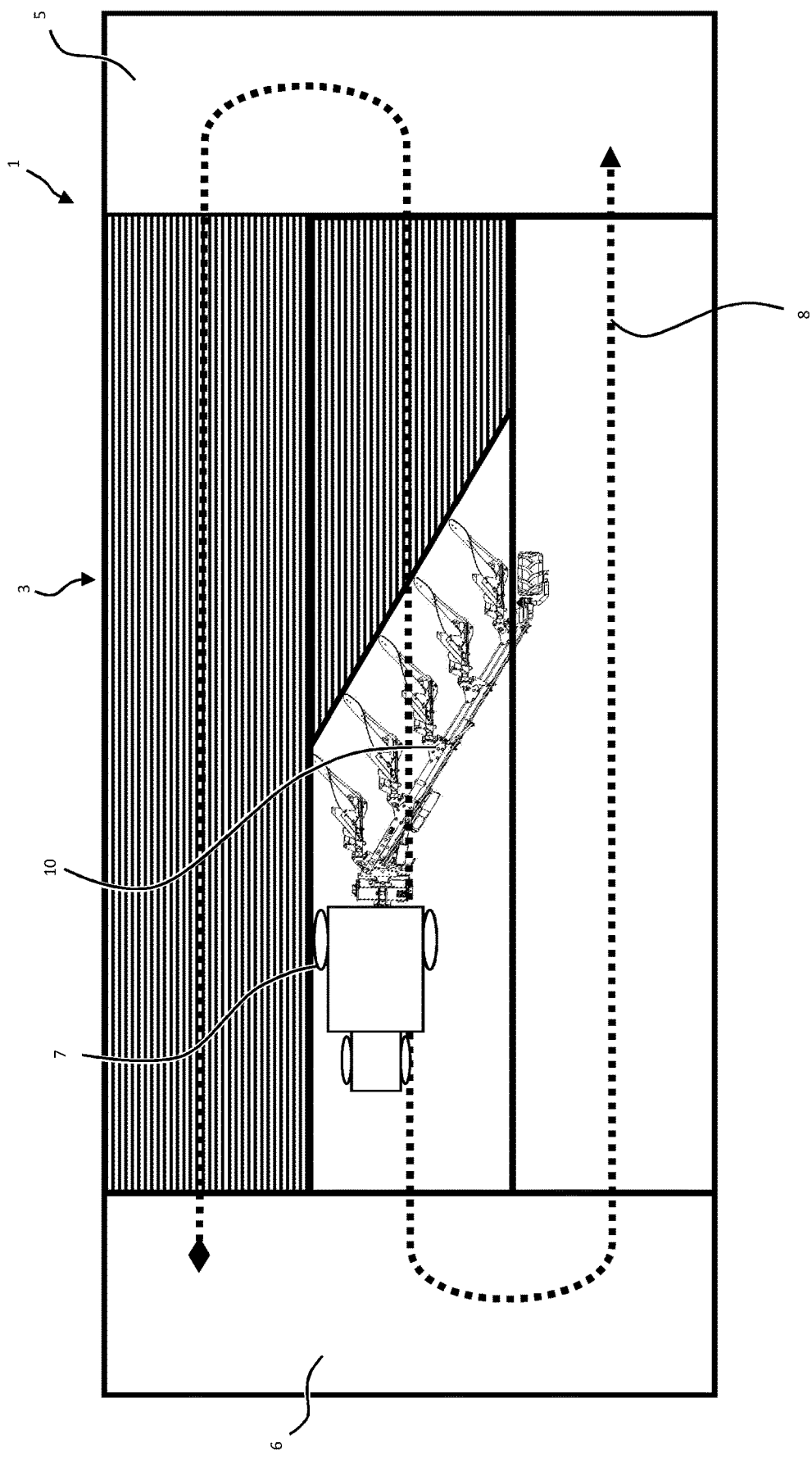
FIG. 8 shows a schematic trajectory of an agricultural machinery when working a field.

Turning to FIG. 8, a typical operation of agricultural machinery comprising a tractor 7 and a plough 10 is described. In use, the plough 10 is drawn as an attachment (implement) behind an agricultural towing vehicle (e.g. tractor 7). It will be appreciated that it is equivalently feasible to locate the plough 10 in front of or both in front of and behind the tractor 7.

FIG. 8 shows a schematic work area 1, e.g. a crop field, which is divided into a main field 3 and headlands 5,6. A tractor 7 draws the plough 10 across the main field 3 in generally parallel working rows. The working rows are part of the trajectory of the tractor and typically run in parallel with a long edge of the work area 1. Each working row represents an individual run of the agricultural machinery across the field between headlands 5 and 6. As will be described in more detail below, a five-furrow plough, such as the exemplary plough shown in FIGS. 1A to 10 creates a total of five furrows per run.

At the end of each run/working row the tractor 7 and plough 10 use the upcoming headland 5 or 6 for turning around, as indicated by trajectory 8. It is known in the art that the soil of the headlands 5, 6 is subject to greater levels of soil compaction as it receives more traffic per unit area than the main field 3. In order not to disturb the soil of the headlands 5 and 6 more than necessary, it is known to lift the ground engaging tools, such as the plough bodies and the skimmers, off the ground into a headland or transfer position, just before the plough 10 reaches the headlands 5 or 6 respectively. Once the tractor 7 and the corresponding plough 10 have turned on the headland 5, 6, the ground engaging tools of the plough 10 are, again, lowered towards an operating position to engage the soil of the main field 3.

In the illustration of FIG. 8, the plough 10 is working on the main field 3 and, therefore, is arranged in the operating position. As the plough 10 reaches the border between the headland 5/6 and the main field 3, the plough 10 is transferred to a transfer position. It follows that each working row starts with an adjustment of the plough from the transfer position into the operating position and ends with an adjustment of the plough from the operating position into the transfer position.

The plough 10 shown in FIGS. 1A to 10 is of the fully-mounted type. In fully-mounted ploughs, the weight of the plough is carried exclusively by the tractor when the plough is in its transfer position (on the headlands). In other words, the plough is then exclusively supported by the tractor 7 via headstock 14 and may be lifted off the ground with a lift cylinder of a tractor linkage.

Figure 4:
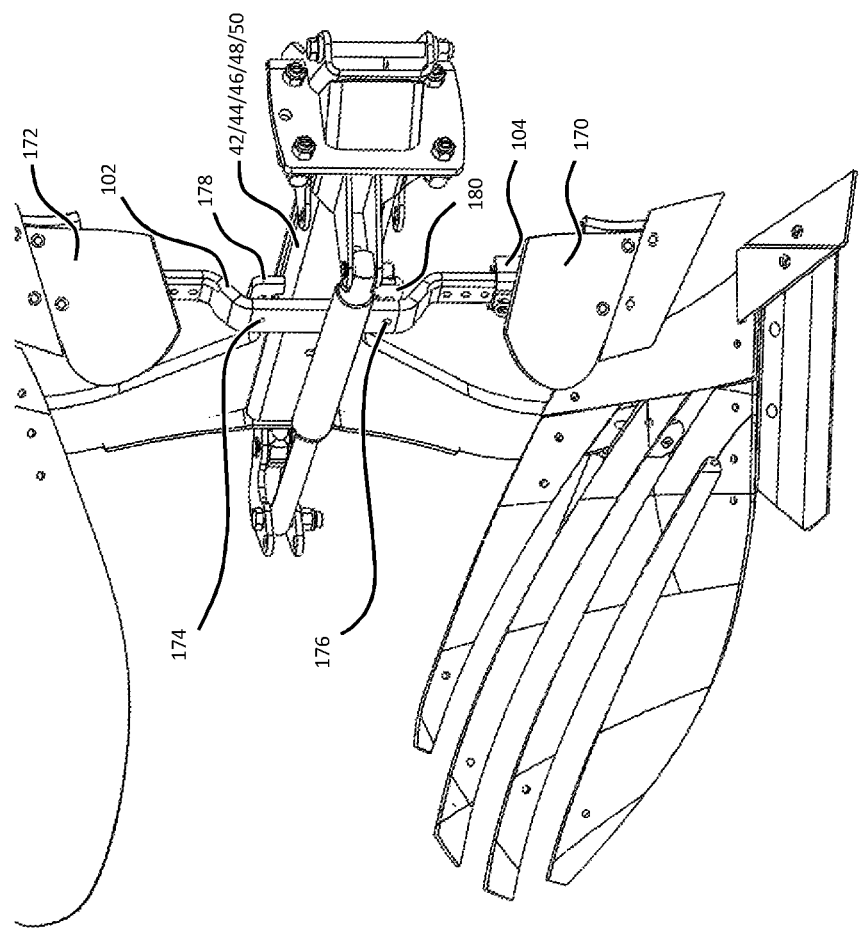
FIG. 4 shows a perspective view of the embodiment shown in FIG. 3 attached to the main frame of a plough implement.

During the turning movement on the headlands, the plough 10 is also reversed. That is, the main frame 12 is rotated by about 180 degrees with respect to the headstock 14 to move the plough from a first configuration to a second configuration. It will be appreciated that if the operator is ploughing in the furrow (as shown in FIG. 4), then the main frame 12 may not be rotated by exactly 180 degrees, it is more likely to be 190-200 degrees or 160-170 degrees depending on which direction the main frame 12 turns. If operator is ploughing on-land, then the main frame 12 may be rotated by an angle that is closer to 180 degrees, perhaps exactly 180 degrees.

In its first configuration shown in FIGS. 1A to 10, the plough 10 is set up such that plough bodies 22a, 24a, 26a, 28a, and 30a of each of the pairs are in contact with the soil. This first configuration is shown in FIG. 8 and sometimes referred to as the "right turning configuration", since the mouldboards of the plough bodies 22a, 24a, 26a, 28a and 30a are arranged to move the soil sideways from left to right when viewed in the direction of travel. In its second configuration (not illustrated), the plough 10 is set up such that plough bodies 22b, 24b, 26b, 28b, and 30b of each of the pairs are in contact with the soil. This second configuration is achieved after rotating the main frame by 180 degrees, such that the majority of plough bodies are arranged to the right of the tractor (not shown). It follows that the second configuration is also referred to as the "left turning configuration".

Tilling the field with the plough 10 in this first configuration provides a first furrow created by the first plough body 22a, a second furrow created by the second plough body 24a, a third furrow created by the third plough body 26a, a fourth furrow created by the fourth plough body 28a, and a fifth furrow created by the fifth plough body 30a. A furrow width is determined by the lateral distance d between the plough bodies 22a, 22b, 24a, 24b, 26a, 26b, 28a, 28b, 30a, 30b, as illustrated in FIG. 10.

As the reversible plough 10 reaches the end of the first run, the main frame 12 is rotated by 180 degrees (reversed) with respect to the headstock 14. A turning cylinder (not shown), attached to the headstock 14 is typically used to rotate (reverse) the plough 10. During rotation of the main frame, the first set of plough bodies, e.g. 22a, 24a, 26a, 28a, 30a, are transferred to the top of the plough 10. At the same time, the second set of plough bodies e.g. 22b, 24b, 26b, 28b, 30b, that were not in use in the previous run is then transferred to the lower end of the plough 10 and will be submerged in the soil during the next run. The reversible plough is then in its second configuration (not shown).

Executing a second run of the field with the plough 10 in this second configuration provides a first furrow created by the sixth plough body 22b, a second furrow created by the seventh plough body 24b, a third furrow created by the eighth plough body 26b, a fourth furrow created by the ninth plough body 28b, and a fifth furrow created by the tenth plough body 30b.

Reversing the plough 10 between consecutive runs has the advantage that the plough bodies 22a, 22b, 24a, 24b, 26a, 26b, 28a, 28b, 30a, 30b that engage the soil always face the same side edge of the main field 3, irrespective of the tractor's orientation.

In order to improve the ploughing results, skimmers 32a, 32b, 34a, 34b, 36a, 36b, 38a, 38b, 40a, 40b are attached in front of the plough bodies 22a, 22b, 24a, 24b, 26a, 26b, 28a, 28b, 30a, 30b. A first pair of skimmers 32a, 32b is arranged in front the first pair of plough bodies 22a, 22b. A second pair of skimmers 34a, 34b is arranged in front of the second pair of plough bodies 24a, 24b. A third pair of skimmers 36a, 36b is attached in front of the third pair of plough bodies 26a, 26b. A fourth pair of skimmers 38a, 38b is attached in front of the fourth pair of plough bodies 28a, 28b. A fifth pair of skimmers 40a, 40b is attached in front of the fifth pair of plough bodies 30a, 30b.

The skimmers 32a, 32b, 34a, 34b, 36a, 36b, 38a, 38b, 40a, 40b are arranged higher than their corresponding plough bodies 22a, 22b, 24a, 24b, 26a, 26b, 28a, 28b, 30a, 30b to not penetrate the soil as far as the plough bodies. It follows that the skimmers 32a, 32b, 34a, 34b, 36a, 36b, 38a, 38b, 40a, 40b are configured to only lift a top layer off the ground surface before the soil is turned over by the plough body that is arranged immediately behind the skimmer.

Each pair of skimmers 32a, 32b, 34a, 34b, 36a, 36b, 38a, 38b, 40a, 40b is attached to the main frame 12 by means of a mounting assembly 52, 54, 56, 58, 60.

The length of the mounting assemblies 52, 54, 56, 58, 60 determines the distance between the main frame 12 and the skimmers, and thus the working depth of the skimmers 32a, 32b, 34a, 34b, 36a, 36b, 38a, 38b, 40a, 40b. In more traditional ploughs, the length of the mounting assemblies 52, 54, 56, 58, 60 are non-adjustable. The same is true for the plough bodies 22a, 22b, 24a, 24b, 26a, 26b, 28a, 28b, 30a, 30b, as traditional beams 42, 44, 46, 48, 50 are not adjustable. It follows that, in more traditional ploughs, the working depth relationship between the plough bodies and the skimmers is fixed, such that the working depth of the skimmers and plough bodies may only be adjusted together.

Adjustment of the working depth of the skimmers 32a, 32b, 34a, 34b, 36a, 36b, 38a, 38b, 40a, 40b and the plough bodies 22a, 22b, 24a, 24b, 26a, 26b, 28a, 28b, 30a, 30b may be achieved by means of a linkage 62 that attaches the plough wheel 20 to the frame 12. As linkage 62 is shortened, the main frame 12 moves closer to the ground surface, thereby increasing the working depth of the plough bodies 22a, 22b, 24a, 24b, 26a, 26b, 28a, 28b, 30a, 30b and the skimmers 32a, 32b, 34a, 34b, 36a, 36b, 38a, 38b, 40a, 40b. The inverse is the case if linkage 62 is extended, such as the main frame 12 is distanced further from the ground surface, thereby pulling the plough bodies 22a, 22b, 24a, 24b, 26a, 26b, 28a, 28b, 30a, 30b and the skimmers 32a, 32b, 34a, 34b, 36a, 36b, 38a, 38b, 40a, 40b out of the ground.

In order to provide some flexibility in the depth ratio between the plough bodies and the skimmers, the mounting assembly of the present disclosure allows for a working depth adjustment of the plough skimmers independently of the plough bodies. In other words, the mounting assembly renders the distance between the plough skimmers 32a, 32b, 34a, 34b, 36a, 36b, 38a, 38b, 40a, 40b and the main frame 12 adjustable.

Figure 2B:
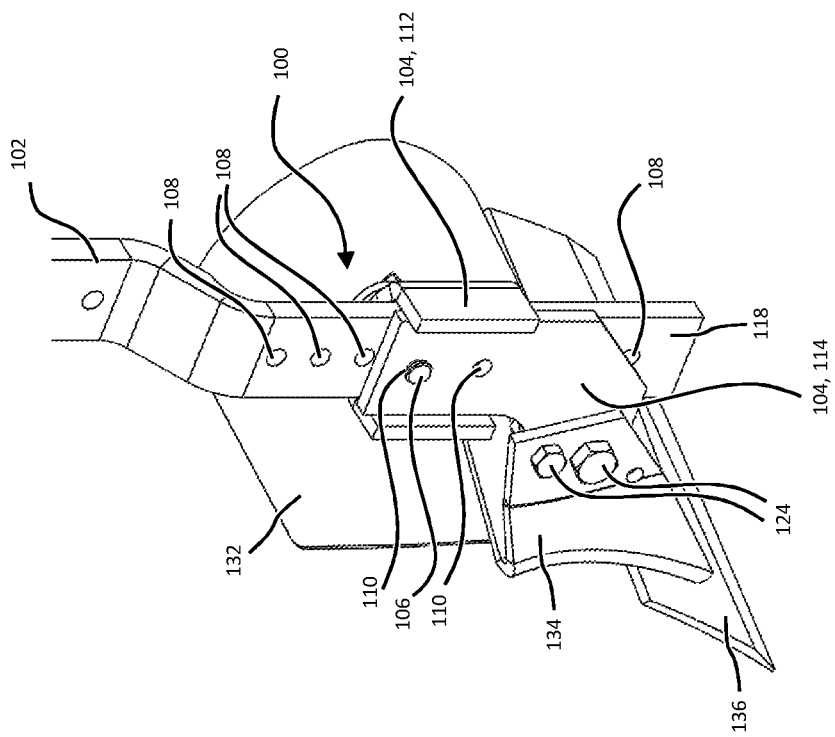
FIGS. 2A and 2B show perspective views of a mounting assembly according to an embodiment of the present disclosure.
Figure 2A:
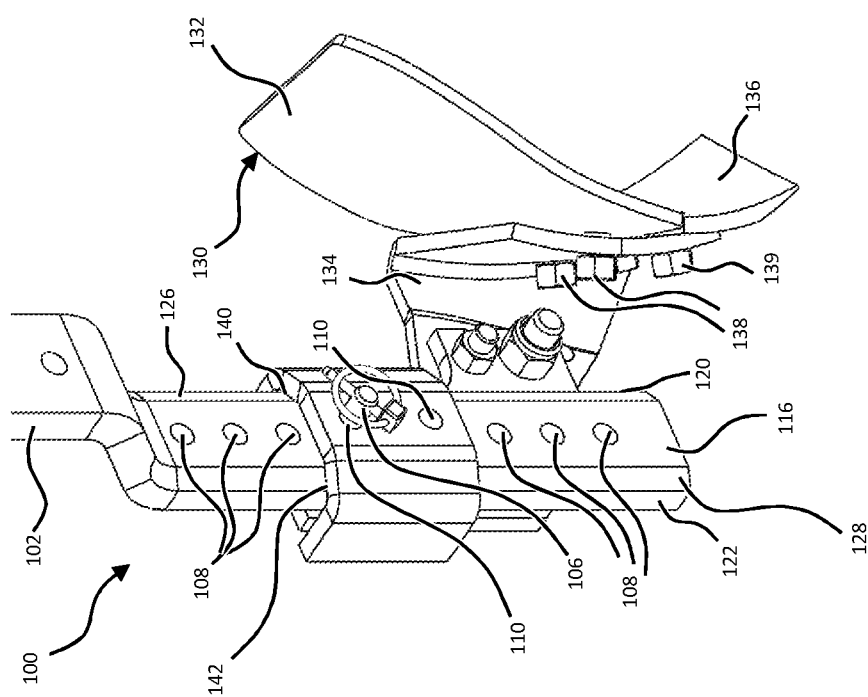

FIGS. 2A and 2B show an embodiment of a mounting assembly according to the present disclosure. The mounting assembly 100 is used to connect the skimmer 130 to the main frame 12 of the plough 10. It should be noted that the mounting assembly 100 may either be mounted on a conventional, non-reversible plough or on a reversible plough, such as the plough 10 shown in FIGS. 1A to 1G.

The skimmer 130 shown in FIGS. 2A and 2B generally comprises three parts that are removably attached to each other: a mouldboard 132, a saddle or frog 134, and a share 136. The mouldboard 132 of the skimmer 130 is connected to the saddle or frog 134. In this embodiment, the mouldboard 132 is removably connected to the frog 134 by means of various fastening members 138. Adjacent to the mouldboard 132, there is provided the share 136. The share 136 is arranged below the mouldboard 132 in the configuration shown in FIGS. 2A and 2B. The share 136 is removably connected to the frog 134 by means of fastening member 139. The share 136 is designed to engage the soil and lift off a top layer of the soil while the mouldboard 132 will overturn the so lifted soil in preparation for the plough bodies.

The skimmer 130 is connected to the mounting assembly 100 via a back end of the frog 134.

The mounting assembly 100 shown in FIGS. 2A and 2B comprises a mounting rail 102, which is connected to the main frame 12, as will be described in more detail below. The mounting rail 102 may be a solid rail with a polygonal cross-section. The mounting rail has a first side 116 and an opposite second side 118. Opposite third and fourth sides 120, 122 extend transversely to and connect the first and second sides 116, 118.

The mounting assembly 100 further comprises a skimmer support bracket 104. The skimmer support bracket 104 surrounds a part of the length of mounting rail 102, as is illustrated in FIGS. 2A and 2B. In this example, the skimmer support bracket 104 has a collar-like shape that matches the shape of the mounting rail 102. In other words, an inner surface of the skimmer support bracket 104 matches the outer surface of the mounting rail 102.

The skimmer support bracket 104 is connected to the mounting rail 102 via a removable locking pin 106. To this end, the locking pin 106 may extend through the skimmer support bracket 104 and the mounting rail 102. The mounting rail 102 comprises a plurality of mounting holes 108 distributed along its length. In the example of FIGS. 2A and 2B, the mounting holes 108 of the mounting rail 102 are distributed equidistantly along the length of the mounting rail 102. The mounting holes 108 of the mounting rail 102 are sized to receive the locking pin 106.

The mounting bracket 104 comprises mounting holes 110 sized to receive the locking pin 106. The mounting holes 110 of the skimmer support bracket 104 are arranged either side of the mounting rail 102, when the support bracket 104 is slipped over the mounting rail 102. In the example of FIGS. 2A and 2B, the skimmer support bracket 104 comprises two mounting holes 110 on both sides of the mounting rail 102. The longitudinally spaced mounting holes 110 on each side of the skimmer support bracket 104 are offset from each other by a distance that is slightly larger than a distance between the mounting holes 108 of the mounting rail 102. Accordingly, the position of the skimmer support bracket 104 with respect to the mounting rail 102 can be changed either by aligning the support bracket 104 with different mounting holes 108 of the mounting rail 102 and/or by changing the pin from one pair of mounting holes 110 to the other pair of mounting holes 110.

The mounting rail 102 is preferably rigidly attached to the main frame 12. Accordingly, any movement of the skimmer support bracket 104 with respect to the mounting rail 102 results in an adjustment of the skimmer support bracket with respect to the main frame 12. This adjustment of the position of the skimmer support bracket 104 with respect to the main frame 12 results in a depth adjustment of the skimmer 130 attached to the skimmer support bracket 104.

The skimmer 130 is attached to the skimmer support bracket 104 at a back end of the frog 134. The frog 134 is connected to the skimmer support bracket via one or more fastening members 124.

Figure 5A:
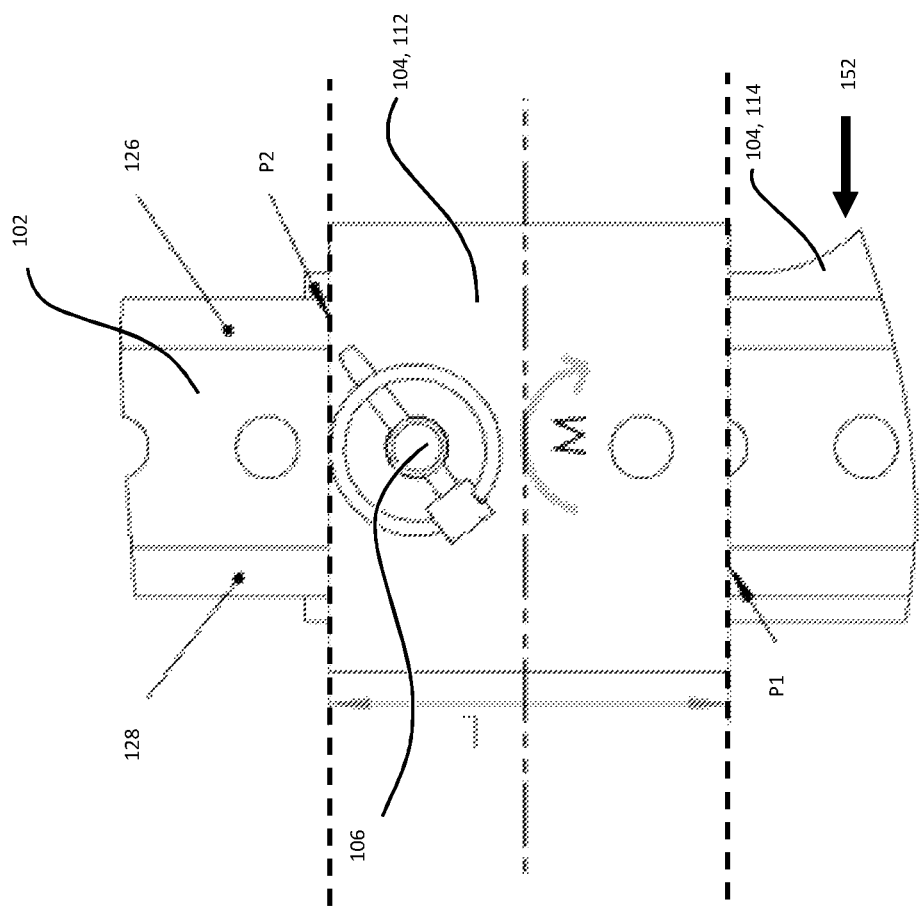
FIG. 5A shows a schematic front view of the mounting assembly of FIG. 2A.

The skimmer support bracket 104 shown in FIGS. 2A and 2B is manufactured as a two-piece structure. The skimmer support bracket 104 comprises a first part 112 and a second part 114. The first and second parts 112, 114 are manufactured individually and connected to each other, either removably or permanently, thereafter. In the example of FIGS. 2A and 2B, the first and second parts 112, 114 of the skimmer support bracket 104 are permanently attached to each other by means of welding (welds 160, 162 are shown in FIG. 5B).

The first part 112 of the skimmer support bracket 104 is shaped to cover a first side 116 of the mounting rail 102. As set out in more detail below, the first part 112 of the skimmer support bracket 104 is shaped to contact first and second bevelled edges 126, 128 of the mounting rail. The second part 114 of the skimmer support bracket 104 is shaped to be attached to a second side 118 of the mounting rail 102, the second side 118 being opposite to the first side 116.

The first part 112 of the skimmer support bracket 104 has a U-shaped cross-section and thus not only covers the first side 116 of the mounting rail 102 but also the third and fourth sides 120, 122 of the mounting rail 102. The legs of the U-shaped first part 112 are spaced slightly from the third and fourth sides 120, 122 to avoid contact between the legs and the third and fourth sides 120, 122, when the skimmer support bracket 104 is connected to the mounting rail. The second part 114 of the skimmer support bracket 104 is plate-shaped. In particular, the second part 114 is an L-shaped plate. The second part 114 is connected to the first part 112 at a first end (e.g. by welding). At an opposite, second end, the second part 114 is releasably connected to the frog 134 by means of removable fastening members 124. One or both fastening members 124 may also act as a stone protection and may thus be shear bolts. Together, the first and second parts 112, 114 are designed to surround at least parts of the mounting rail 102. In the illustrated embodiment, the first and second parts together create a collar that encompasses the mounting rail 102.

In the embodiment of FIGS. 2A and 2B, the mounting rail 102 is a chamfered polygon. A first bevelled edge 126 extends between the first side 116 and the third side 120 of the mounting rail 102. A second bevelled edge 128 extends between the first side 116 and the fourth side 122 of the mounting rail 102. The bevelled edges act as mating surfaces between the mounting rail 102 and the skimmer support bracket 104. In the illustrated example, the bevelled edges 126, 128 are mating surfaces between the mounting rail 102 and the first part 112 of the skimmer support bracket 104.

Both bevelled edges 126 and 128 of the mounting rail 102 are arranged obliquely to a ploughing direction (150, FIG. 5B). The mounting bracket 104 includes mating surfaces, which are aligned and mate with the bevelled edges 126, 128 of the mounting rail 102. In particular, a first mating surface 140 of the skimmer support bracket 104 is arranged to mate with the first bevelled edge 126 of the mounting rail 102. A second mating surface 142 of the skimmer mounting bracket 104 is arranged to mate with the second bevelled edge 128 of the mounting rail 102. In other words, when in use, the mating surfaces 140, 142 of the skimmer support bracket 104 extend at the same angle with respect to the ploughing direction as the first and second bevelled edges 126, 128 of the mounting rail 102. The first mating surface 140 extends between a base and a first leg of the U-shaped first part 112. The second mating surface 142 extends between the base and a second leg of the U-shaped first part 112.

The skimmer support bracket 104 and the mounting rail 102 are formed to only contact each other in three regions, when in use. A first contact area is set to be between the second part 114 of the skimmer support bracket 104 and the second side 118 of the mounting rail. A second contact area is formed between the first bevelled edge 126 of the mounting rail 102 and a first mating surface 140 of the skimmer support bracket. A third contact area is formed between the second bevelled edge 128 of the mounting rail 102 and a second mating surface 142 of the skimmer support bracket 104.

Figure 3:
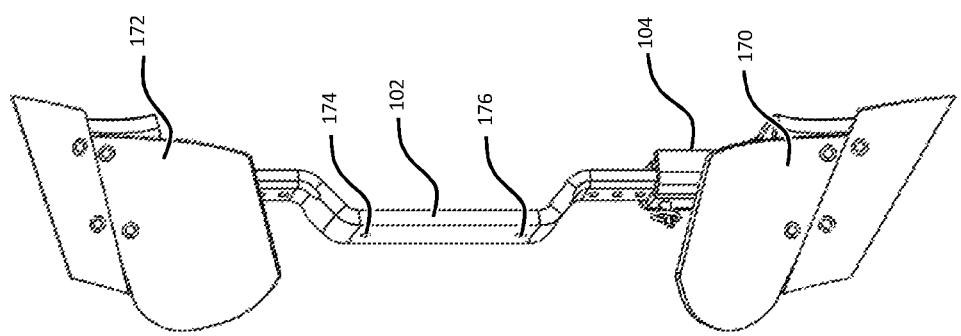
FIG. 3 shows a perspective view of a mounting assembly according to an embodiment of the present disclosure with reversible skimmers.

FIGS. 3 and 4 show an application of the mounting assembly 100 shown in FIGS. 2A and 2B for a reversible plough. In this embodiment, the mounting rail 102 carries two skimmer support brackets 104 (only the lower support bracket is visible), one for a first (lower) skimmer 170 and one for a second (upper) skimmer 172. The mounting rail 102 may be removably connected to the main frame 12 via mounting holes 174, 176. Mounting holes 174, 176 can be aligned with and connected to attachment lugs 178, 180 on the main frame 12. The two skimmer support brackets 104 of the mounting rail 102 can be adjusted independently. In other words, the lower skimmer support bracket 104 can be used to adjust the depth of the lower skimmer 170 independently of the depth of the upper skimmer 172 that is set by the upper skimmer support bracket (not shown).

As shown in FIGS. 3 and 4, the mounting rail 102 may further feature a curved design that is adapted to receive a part of the beam frame such that the beam frame and the upper and lower skimmers 170, 172 are in vertical alignment when the mounting rail is attached to the beam.

It will be appreciated that pulling the skimmers 170, 172 of FIGS. 3 and 4 through the soil results in a reactive force acting to push the skimmers 170, 172 towards their respective mounting assembly. An example of such a reactive force 152 is shown in FIG. 5A. The reactive force 152 acts on the skimmers (not shown in FIG. 5A), which transfer the force onto the skimmer support bracket 104, via the second part 114. The reactive force 152 creates a torque M about pin 106, the torque M acting to press the skimmer support bracket 104 against the outside surface of the mounting rail 102. In particular, due to the torque M, the skimmer support bracket 104 will be biased against the mounting rail 102 in planes P1 and P2.

Figure 5C:
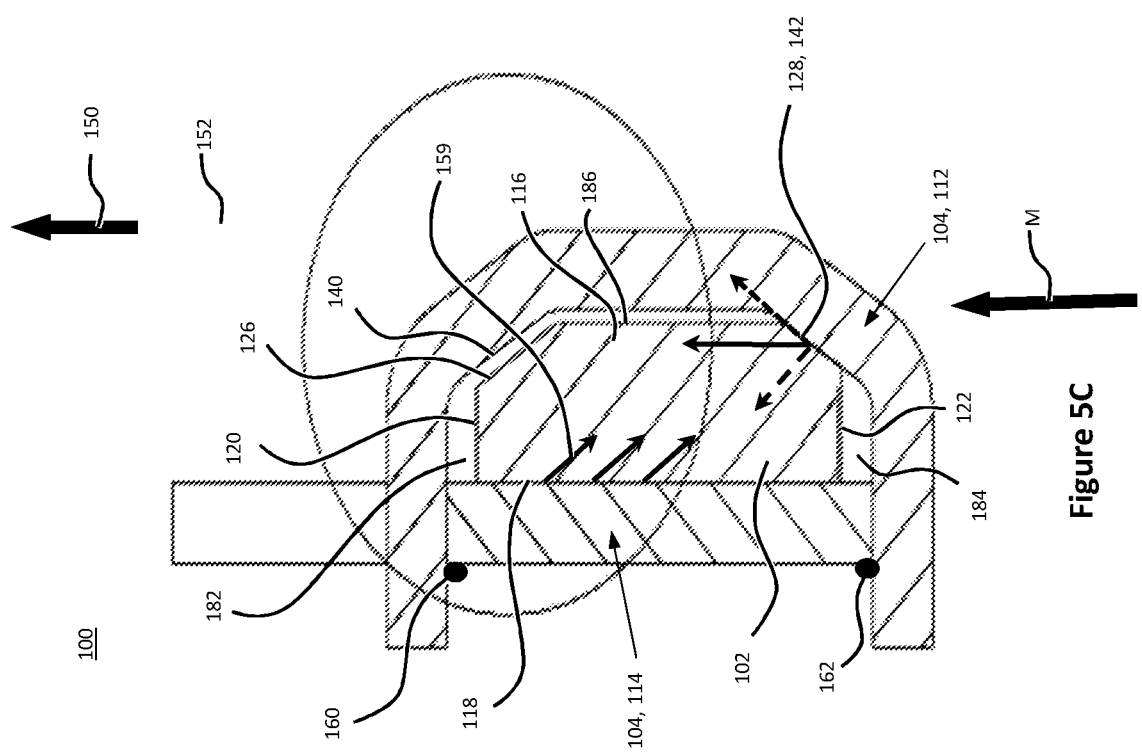
FIG. 5C shows a schematic cross-section of the mounting assembly of FIG. 2A along plane P2.
Figure 5B:
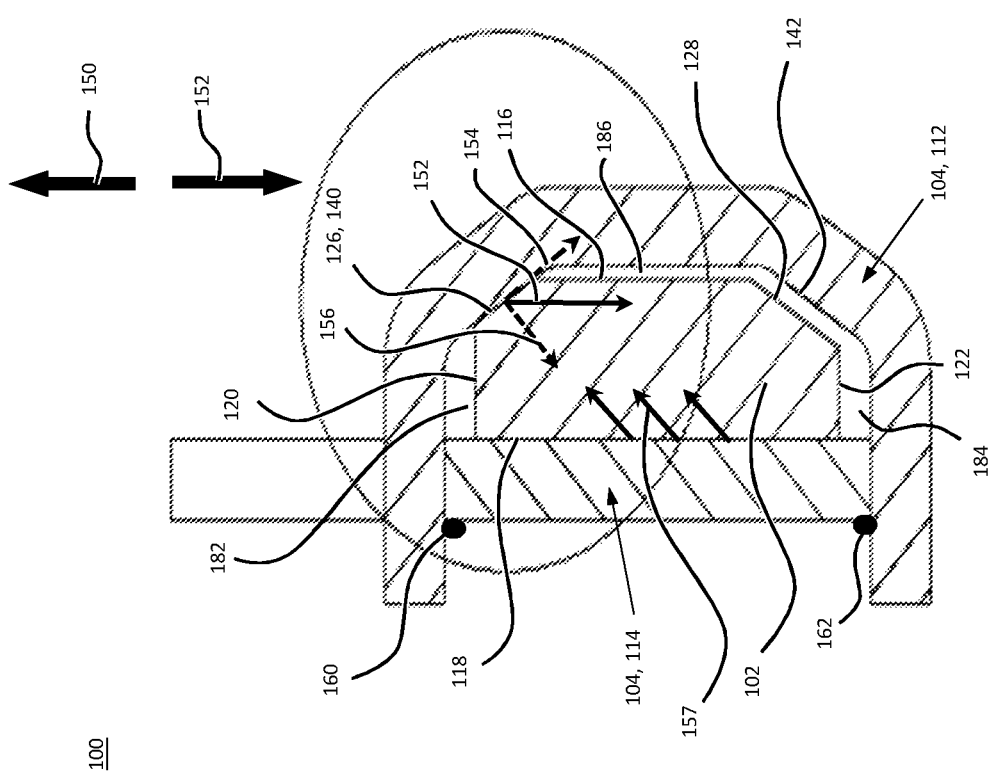
FIG. 5B shows a schematic cross-section of the mounting assembly of FIG. 2A along plane P1.

Turning to FIGS. 5B and 5C, there are shown schematic cross-sections of the mounting assembly 100 shown in FIGS. 2A and 2B, along planes P1 and P2 of FIG. 5A. FIG. 5B shows a cross-section along plane P1 of FIG. 5A.

As the plough starts moving and the skimmers are introduced into the soil, the reactive force 152 is applied to the skimmers and, therefore, the mounting assembly 100. The reactive force 152 acts in a direction opposite to the ploughing direction 150 of the plough 10. Reactive force 152 will act on the skimmer 130/170 and be transferred to the support bracket 104 via frog 134 such that the support bracket is pushed into engagement with the mounting rail 102, as is schematically illustrated in FIG. 5B. In plane P1, the first part 112 of the skimmer support bracket 104 will be biased against the mounting rail 102. In this particular example, the mating surface 140 is being pushed towards the bevelled edge 126 of the mounting rail 102 by reactive force 152.

As the first mating surface 140 is pushed onto the corresponding mating surface of the mounting rail 102 (i.e.

bevelled edge 126), the reactive force 152 bracing the two mating surfaces (126, 140) together will create force components acting in two directions. A first force component 154 acts in parallel with the first mating surface 140/the first bevelled edge 126. A second force component 156 acts perpendicular to the first mating surface 140 of the skimmer support bracket 104/the first bevelled edge 126. It follows that the force components 154 and 156 brace the mounting rail 102 and the skimmer support bracket 104 against each other in at least two directions when the plough skimmer 130 is in use. As mentioned above, both the first mating surface 140 and the corresponding first bevelled edge 126 are arranged obliquely to the ploughing direction 150, and thus also obliquely with respect to the reactive force 152.

As a consequence of the bevelled edge 126 being oblique to the direction of travel, the reactive force 152 tries to slide the skimmer support bracket 104 in the direction of the first force component 154 along the bevelled edge 126. This will cause the second mating surface 142 of the skimmer support bracket 104 to be pushed away from the second bevelled edge 128. At the same time, the skimmer support bracket 104 will be pushed against the second side 118 of the mounting rail 102. In other words, the mating surfaces 126, 140 together cause a movement of the skimmer support bracket 104 with respect to the mounting rail 102, that wedges the first bevelled edge 126 and the second side 118 of the mounting rail 102 between the first and the second parts 112, 114 of the skimmer support bracket 104.

The creation of the two force components 154, 156 results in a self-locking effect in two different directions that are perpendicular in this example. It follows that the skimmer support bracket 104 is prevented from movement with respect to the mounting rail 102 in a horizontal plane that coincides with the cross-sectional plane of FIGS. 5B and 5C. At the same time, movement of the skimmer support bracket 104 with respect to the mounting rail 102 in a vertical direction is prevented by means of the locking pin 106 described above. Accordingly, the mounting assembly of the present disclosure is locked in three translational degrees of freedom when the plough skimmers are in use.

In plane P2, shown in FIG. 5C, an opposite end of the skimmer support bracket 104 contacts the mounting rail 102, due to torque M. More specifically, the second mating surface 142 of the skimmer support bracket 104 is pushed against the second bevelled edge 128 of the mounting rail 102 by torque M. The torque M results in force components acting perpendicular directions. A first force component acts in parallel with the second mating surface 142/the second bevelled edge 128. A second force component acts perpendicular to the second mating surface 142 of the skimmer support bracket 104/the second bevelled edge 128 of the mounting rail 102.

As a consequence of the bevelled edge 128 being oblique to the direction of travel, the moment M tries to slide the skimmer support bracket 104 in the direction of the first force component along the bevelled edge 128. This will cause the first mating surface 140 of the skimmer support bracket 104 to be pushed away from the first bevelled edge 126. At the same time, the skimmer support bracket 104 will be pushed against the second side 118 of the mounting rail 102. In other words, the mating surfaces 128, 142 together cause a movement of the skimmer support bracket 104 with respect to the mounting rail 102, that wedges the second bevelled edge 128 and the second side 118 of the mounting rail 102 between the first and the second parts 112, 114 of the skimmer support bracket 104.

From the cross-sections in FIGS. 5B and 5C it will be appreciated that an outer surface of the mounting rail 102 substantially matches an inner surface of the skimmer support bracket 104. However, it should be noted that the shapes of the mounting rail 102 and the skimmer support bracket 104 are designed such that the skimmer support bracket 104 can only contact the mounting rail along surfaces 118, 126, and 128. The remaining surfaces 116, 120, and 122 will remain spaced from the skimmer support bracket 104 to guarantee that reactive force 152 is transferred to the mounting rail 102 via mating surfaces 126, 140 or 128, 142 respectively. It follows that a first gap 182 is provided between the first part 112 of the skimmer support bracket 104 and the third surface 120 of the mounting rail 102. A second gap 184 is provided between the first part 112 of the skimmer support bracket 104 and the fourth surface 122 of the mounting rail 102. A third gap 186 is provided between the first part 112 of the skimmer support bracket 104 and the first surface 116 of the mounting rail 102. Consequently, the first part 112 of the skimmer support bracket 104 contacts only the bevelled edges 126 and 128 of the mounting rail 102 with the corresponding mating surfaces 140, 142.

Figure 6B:
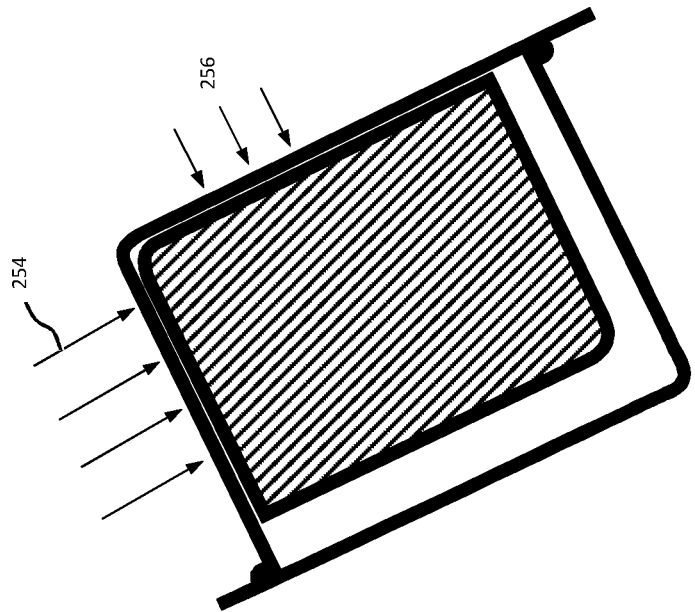
FIG. 6B shows a schematic cross-section of the embodiment shown in FIG. 6A during ploughing.
Figure 6A:
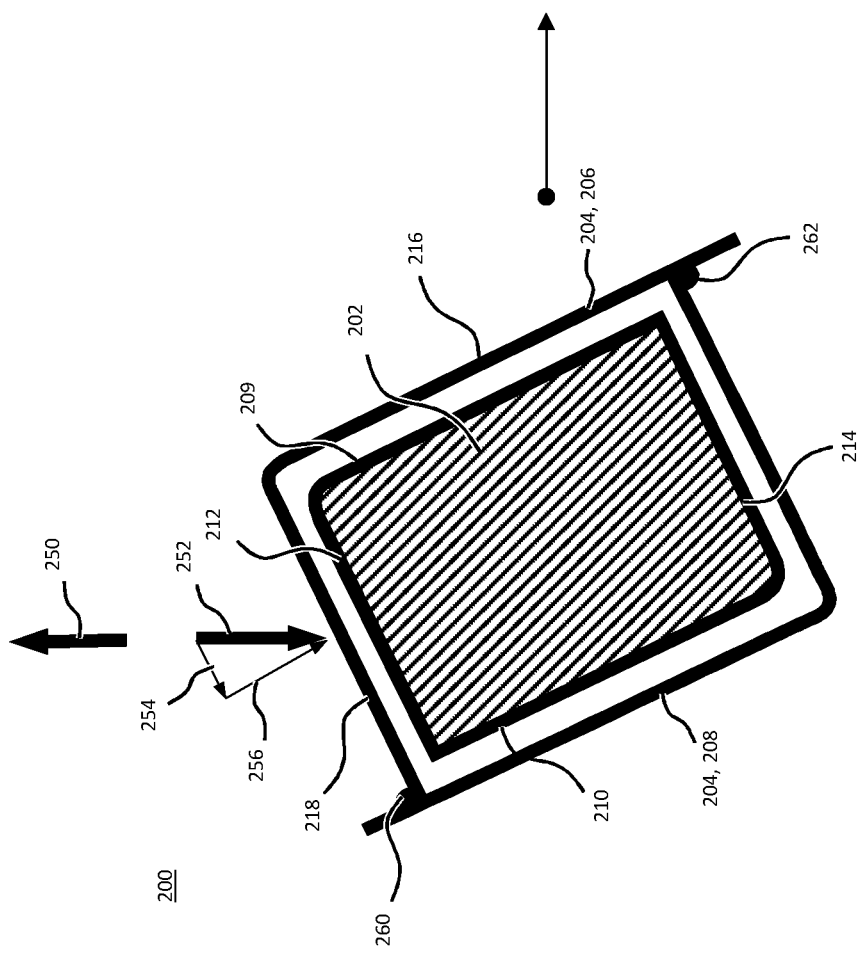
FIG. 6A shows a schematic cross-section of another embodiment of the mounting assembly according to the present disclosure in a static state.

An alternative arrangement of the mounting assembly according to the present invention is shown in FIGS. 6A and 6B. The mounting assembly 200 of this embodiment is schematically represented by cross-sections similar to the one illustrated in FIG. 5B. FIGS. 6A and 6B show cross sections along a plane that corresponds to P1 of FIG. 5A. In FIG. 6A, the assembly is at rest, i.e. the reactive force 152 is not yet acting on the skimmer support bracket 104. FIG. 6B shows a state in which the skimmer support bracket 204 is biased towards the mounting rail 202 by means of a reactive force 252. In contrast to the mounting assembly 100 shown in FIGS. 5B and 5C, the mounting assembly of the embodiment in FIGS. 6A and 6B has a mounting rail 202 that does not include bevelled edges. Rather, the mounting rail 202 of mounting assembly 200 is substantially rectangular in cross-section. The corresponding skimmer support bracket 204 also has a substantially rectangular shape that matches the rectangular shape of the mounting rail 202.

Again, the skimmer support bracket 204 is constructed as a two-piece structure with a first part 206 and a second part 208. The first part 206 is arranged to be connected to a first surface 209 and a third surface 212 of the mounting rail 202. The second part 208 is arranged to connect to a second surface 210 and a fourth surface 214 of the mounting rail 202. The second surface 210 is opposite to the first surface 209. The fourth surface 214 is opposite the third surface 212. In this embodiment, the first and second parts 206, 208 of the skimmer support brackets 204 are substantially identical in their cross-section. Both the first and second parts 206, 208 have a substantially L-shaped cross section. Each of the two parts 206, 208 makes up about half of the support bracket 204. The first and second parts 206, 208 in this example are welded together by welds 260, 262 along joining edges.

The first part 206 of the skimmer support bracket 204 includes a first mating surface 216 and a second mating surface 218. The first mating surface 216 of the first part 206 is arranged to mate with the first surface 208 of the mounting rail 202, when the plough is in use. The second mating surface 218 of the first part 206 is arranged to mate with the third surface 212 of the mounting rail 202, when the plough is in use.

Both the first and second mating surfaces 216, 218 of the skimmer support bracket 204 are arranged obliquely with respect to a ploughing direction 250. The first surface 208 and the third surface 212 of the mounting rail 202 are arranged with respect to the ploughing direction 250 at substantially the same, oblique angle as the first and second mating surfaces 216, 218.

A reactive force 252 acting on the skimmer support bracket 204 will brace the first and second mating surfaces 216, 218 against the corresponding surfaces 209, 212 of the mounting rail 202. Due to the oblique angle between the mating surfaces and the ploughing direction 250, first and second force components 254, 256 will act to brace the skimmer support bracket 204 and the mounting rail 202 against each other in two directions. The two directions are perpendicular to each other and provide a self-locking effect in a horizontal plane that coincides with the cross-sectional plane of FIGS. 6A and 6B.

Figure 7:
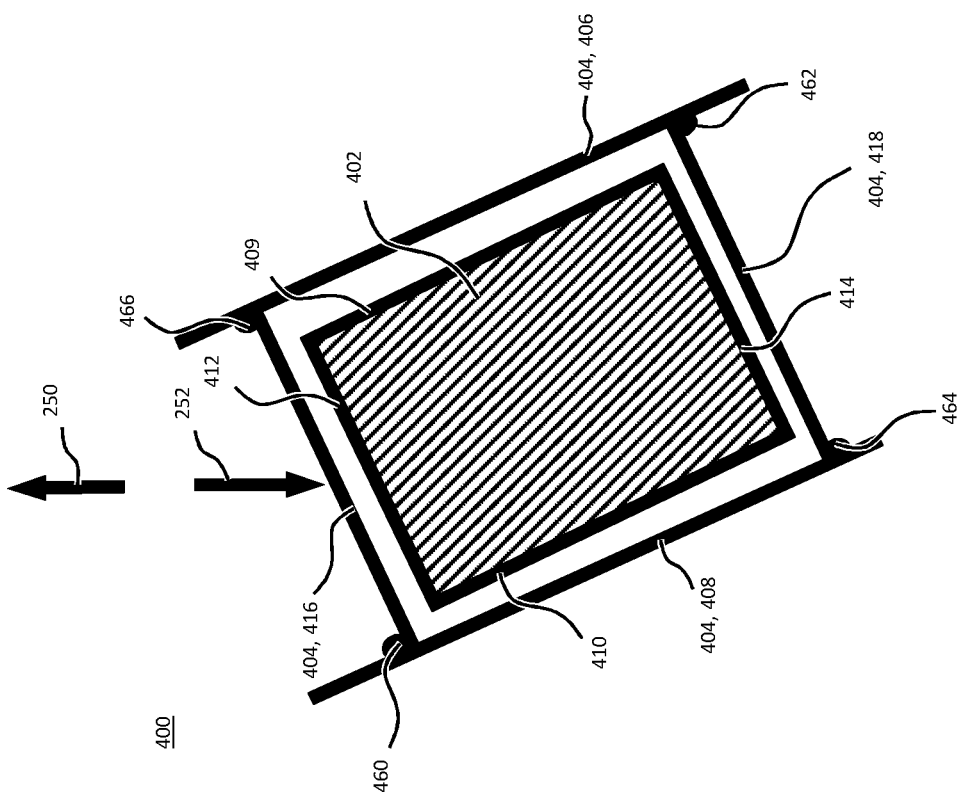
FIG. 7 shows a schematic cross-section of another embodiment of the mounting assembly according to the present disclosure in a static state.

Turning to FIG. 7, there is shown a schematic cross-section of another embodiment of the mounting assembly. The mounting assembly 400 of the embodiment in FIG. 7 corresponds mainly to the arrangement of the embodiment shown in FIG. 6. However, the skimmer support bracket 404 of this embodiment is a four-piece part. A first part 406 may be arranged next to a first surface 409 of the mounting rail 402. A second part 408 may be arranged opposite to the first part 406 and next to a second surface 410 of the mounting rail 402. A third part 416 may be arranged next to a third surface 412 of the mounting rail 402. A fourth part 418 may be arranged opposite to the third part 416 and next to a fourth surface 414 of the mounting rail 402. The first, second, third, and fourth parts 406, 408, 416, 418 in this example are welded together by welds 460, 462, 464, and 464 along joining edges to form a substantially rectangular skimmer support bracket 404.

Similar to FIGS. 6A and 6B, a reactive force 252 acting on the skimmer support bracket 404 will brace the first and second mating surfaces (inside surfaces of parts 406 and 416) against the corresponding surfaces 409, 412 of the mounting rail 402. Due to the oblique angle between the mating surfaces and the ploughing direction 250, first and second force components will act to brace the skimmer support bracket 404 and the mounting rail 402 against each other in two directions.

From the above, it will be understood that the mounting assembly of the present disclosure may have any shape or arrangement, as long as their mating surfaces act to distribute the reactive force of the plough skimmers in two directions, which are oblique to the ploughing direction. In other words, the mounting rail and the skimmer support bracket are arranged with respect to each other such that the reactive force 152, 252 acting on the skimmers is split into two force components, both of which act in different directions and are oblique to the ploughing direction.

Figure 9:
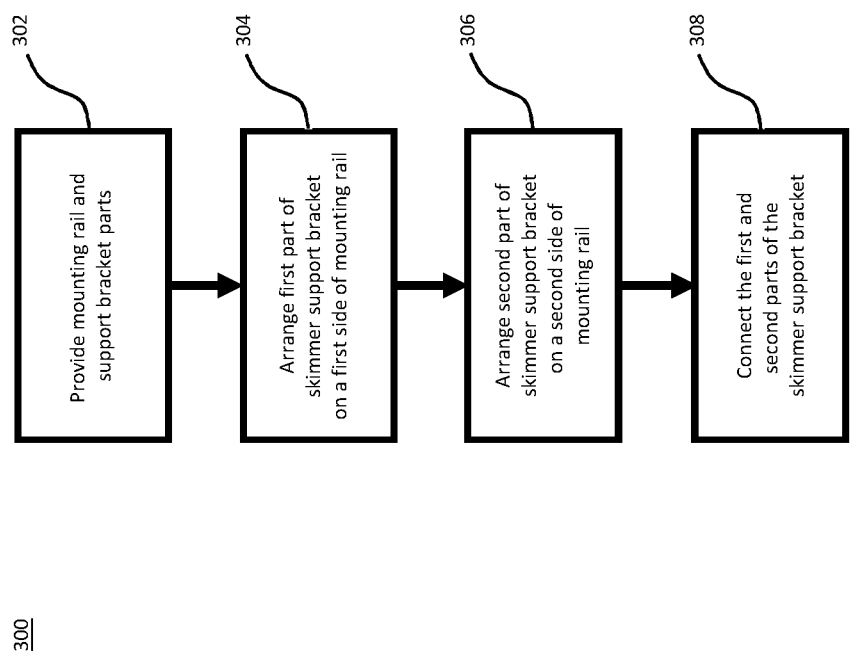
FIG. 9 shows a flow diagram of an embodiment of the method for manufacturing a mounting assembly of the present disclosure.

FIG. 9 shows a flow diagram relating to a method for manufacture of a mounting assembly. The method 300 includes a first step 302 for providing a mounting rail and the two separate parts of a skimmer support bracket such as support bracket 104 described above. In other words, in step 302 the two parts of the skimmer support bracket are not yet connected to each other.

In a second step 304, the first part of the skimmer support bracket is arranged on a first side of the mounting rail. In the mounting assembly 100 of FIGS. 2A and 2B, the first part 112 of the mounting bracket 104 may be slipped over the mounting rail 102 such that the first and second mating surfaces 140, 142 engage with the first and second bevelled edges 126, 128. The first part 112 may then be temporarily connected to the mounting rail 102, e.g. by means of mechanical clamps such that the first part 112 remains in contact with the mounting rail 102 until the first and second parts are connected.

In another step 306, the method comprises arranging the second part of the skimmer on an opposite, second side of the mounting rail. In the embodiment of FIGS. 2A and 2B, the second part 114 of the skimmer support bracket 104 is plate-shaped and sized so as to fit between the limbs of the U-shaped first part 112. Accordingly, in step 306 the second part 114 may be slipped between the limbs of the first part 112 and brought into contact with the second surface 118 of the mounting rail 102. Similar to the first part 112, the second part 114 may be temporarily fixed into position by means of a mechanical clamp. Additionally or alternatively, the temporary connection between the first and second parts 112, 114 of the skimmer support bracket 104 and the mounting rail 102 may be provided by means of a locking pin, such as locking pin 106.

In yet another step 308, the first part and the second part of the skimmer support bracket are connected to each other. In the example of FIGS. 2A and 2B the first part 112 and the second part 114 may be connected by means of welding. A schematic welding connection is shown in FIGS. 5B and 5C. A first weld 160 is provided along a first contact edge between the first and second parts 112, 114 and a second weld line 162 is provided on the opposite edge between the first and second parts 112, 114. Of course, the first and second parts 112, 114 could also be connected to each other in any other way such as gluing or even by means of a removable connection.

Once step 308 has been completed, the temporary connections between the first and second part and the mounting rail can be removed. The resulting skimmer mounting bracket 104 is then moveable along the length of the mounting rail 102 and may be fixed to the latter at different positions determined by mounting holes 108 or 110 respectively.

The use of this manufacturing method has the advantage that play between the skimmer support bracket 104 and the mounting rail 102 can be adjusted accurately and repeatably. In particular, when the first and second parts are temporarily connected to the mounting rail 102, the first and second parts 112, 114 may either be attached directly to the outer surface of the mounting rail 102 or spaced from the latter via spacer elements. The spacer elements can define exact gaps that aid movement of the skimmer support bracket 104 along the length of the mounting rail 102, yet prevent excessive amounts of vibration between the skimmer support bracket 104 and the mounting rail 102.

It will be understood that the first and second parts of the skimmer support bracket may have any shape that act together to surround parts of the mounting rail. For example, it would also be feasible to construct both parts as U-shaped pieces, which are then joined at their respective limbs. Moreover, it is feasible to construct the skimmer support bracket from more than two pieces, for as long as each of the pieces is designed to match the contours of one side surface of the mounting rail.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the disclosure.

The invention claimed is:

1. A mounting assembly for a plough skimmer, the mounting assembly comprising:
   a mounting rail for connecting to a main frame of a plough;
   a skimmer support bracket for connecting a plough skimmer to the mounting rail, such that the skimmer support bracket surround parts of the mounting rail,
   wherein the mounting rail and the skimmer support bracket have aligned mating surfaces that are arranged obliquely to a ploughing direction such that the mounting rail and the skimmer support bracket are braced against each other in at least two directions when the plough skimmer is in use;
   wherein the mounting rail and the skimmer support bracket are arranged such that the skimmer support bracket configured to be fixed to the mounting rail at a plurality of locations along the length of the mounting rail.

2. The mounting assembly of claim 1, wherein the at least two directions are perpendicular to each other.

3. The mounting assembly of claim 1, wherein the at least two directions are oblique to the ploughing direction.

4. The mounting assembly of claim 3, wherein the mating surfaces are arranged at an angle of 10 degrees to 80 degrees, preferably at an angle of 30 degrees to 60 degrees, with respect to the ploughing direction.

5. The mounting assembly of claim 3, wherein a first mating surface of the mounting rail is a bevelled edge.

6. The mounting assembly of claim 1, wherein the mounting rail has a polygonal cross-section.

7. The mounting assembly of claim 1, wherein an outer surface contour of the mounting rail matches an inner surface contour of the skimmer support bracket.

8. The mounting assembly of claim 1, wherein the skimmer support bracket is a two-piece structure.

9. The mounting assembly of claim 8, wherein the skimmer support bracket comprises a first part for connection with a first side of the mounting rail and a second part for connection with an opposite, second side of the mounting rail.

10. The mounting assembly of claim 9, the first part of the skimmer support bracket comprises a first mating surface arranged on an inner surface of the skimmer support bracket, the first mating surface being shaped to mate with a first mating surface of the mounting rail, when the skimmer support bracket is connected to the mounting rail.

11. The mounting assembly of claim 9, wherein the first and second parts of the mounting rail are permanently connected to each other.

12. The mounting assembly of claim 9, wherein the first part has a generally U-shaped cross-section and/or wherein the second part is plate shaped.

13. Method for manufacturing a mounting assembly for a plough skimmer, comprising:
   providing a mounting rail for connecting to the main frame of a plough;
   providing a skimmer support bracket for connecting a plough skimmer to the mounting rail, wherein the mounting rail and the skimmer support bracket are arranged such that the skimmer support bracket configured to be fixed to the mounting rail at a plurality of locations along the length of the mounting rail, the skimmer support bracket being a two-piece structure comprising a first part and a second part;
   arranging the first part of the skimmer support bracket on a first side of the mounting rail,
   arranging the second part of the skimmer on an opposite, second side of the mounting rail;
   connecting the first part and the second part of the skimmer support bracket with each other.

14. The mounting assembly of claim 11, wherein the first and second parts of the mounting rail are welded to each other.

15. The mounting assembly of claim 12, wherein the second part is L-shaped.

* * * * *